Patented Jan. 1, 1924.

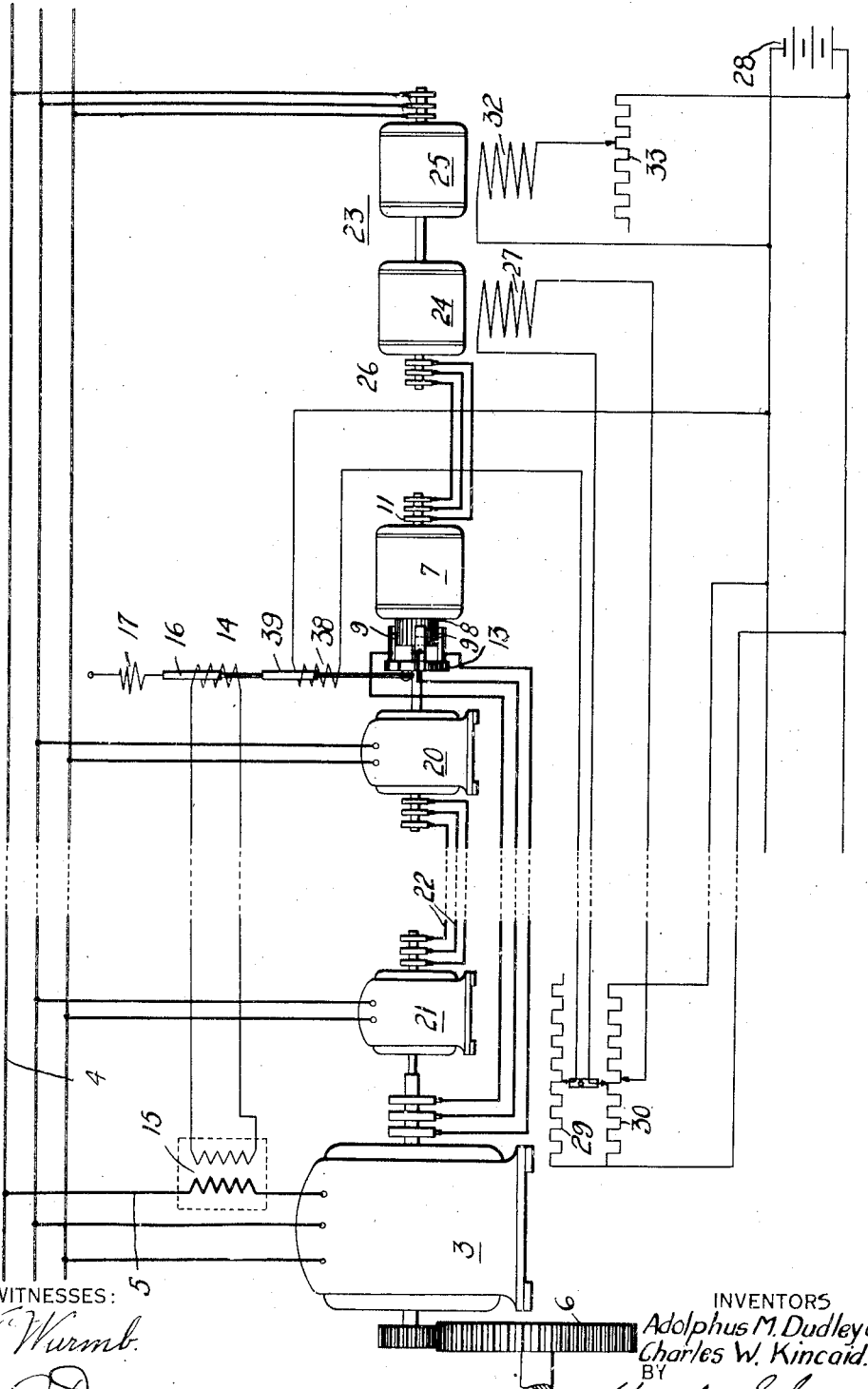

1,479,174

UNITED STATES PATENT OFFICE.

ADOLPHUS M. DUDLEY, OF OAKMONT, AND CHARLES W. KINCAID, OF WILKINSBURG, PENNSYLVANIA, ASSIGNORS TO WESTINGHOUSE ELECTRIC & MANUFACTURING COMPANY, A CORPORATION OF PENNSYLVANIA.

REGULATING SYSTEM FOR INDUCTION MOTORS.

Application filed July 28, 1917. Serial No. 183,340.

*To all whom it may concern:*

Be it known that we, ADOLPHUS M. DUDLEY, a citizen of the United States, and a resident of Oakmont, in the county of Allegheny and State of Pennsylvania, and CHARLES W. KINCAID, a citizen of the United States, and a resident of Wilkinsburg, in the county of Allegheny and State of Pennsylvania, have invented a new and useful Improvement in Regulating Systems for Induction Motors, of which the following is a specification.

Our invention relates to regulating systems for induction motors, and it has for its object to provide a system of the character designated whereby the speed and power factor of an induction motor may be efficiently and effectively controlled with the use of but a relatively small amount of auxiliary apparatus, said auxiliary apparatus being of standard forms.

More specifically, our invention relates to that type of regulating systems for induction motors wherein frequency and voltage-adjusting apparatus is connected between the secondary member of the induction motor and an alternating-current source, so that the voltage and frequency of the secondary member may be adjusted independently of the load on the induction motor.

The accompanying drawing is a diagrammatic view of an induction motor, together with auxiliary supply and regulating apparatus, embodying a preferred form of our invention.

That system of control for induction motors known as the "Scherbius" system is well known wherein the primary member of the induction motor is connected to a source of alternating current and wherein the secondary member of said motor is connected to one end of a frequency changer, the other end of said frequency changer being connected to said alternating current source through a voltage-adjusting transformer. Said frequency changer has, in the past, been directly connected to an induction motor or rigidly coupled thereto as through gearing, and the frequency imposed upon the secondary of the induction motor has been adjusted by voltage adjusting means controlling the voltage of the frequency changer.

According to our invention, the frequency changer is not mechanically coupled with the induction motor, but is driven in synchronism therewith by dynamo-electric means, in a manner and for purposes more fully set forth hereinafter. It is found further that for satisfactory operation, particularly with respect to the power factor, it is advisable that the brushes of the frequency-converter be slightly shifted with load changes in the main motor and, to this end, it is advisable to mount said brushes on a rotatable frame work and to provide means for automatically shifting said frame work in accordance with load changes. Furthermore, the brushes should be given a different setting for each speed adjustment.

Further details and objects of our invention will hereinafter more fully appear.

Referring to the drawing, we show an induction motor at 3, said motor being of the fixed primary type, although a fixed secondary type motor may be employed, if desired. Energy for the operation of the motor 3 is derived from any suitable source, as three-phase mains 4, through suitable primary leads 5. The motor 3 may be connected to supply any desired load, such, for example, as a rolling mill, through gearing indicated at 6.

A frequency-converter 7, preferably of the commutator type, is provided for controlling the speed of the motor 3. The armature of said frequency-converter is preferably similar to that of an ordinary rotary converter and is mounted to co-operate with an unwound field structure (not shown) which may be either fixed or rotatable with the armature, as is well known in the art. The commutator cylinder 8 of the frequency converter 7 is provided with polyphase brushes 9—9 which are connected respectively to slip rings 10—10 comprising the terminals of the secondary winding of the motor 3. The slip rings 11—11 of the frequency-converter 7 are connected to a variable voltage device 23, which will be described more in detail hereinafter. The brushes 9—9 are mounted on a rotatable frame 13 and the position of said frame is fixed by any desired form of electromotor device responsive to load current in the motor 3. We have shown by way of illustration, a solenoid 14 energized from a current-transformer 15 whose primary winding is inserted in one of the supply mains 5. The solenoid 14 is arranged to actuate a core member 16 against a spring 17 so that the frame 13 is rotated with either increasing or decreasing load and has a predetermined fixed position for every degree of load.

It is frequently inconvenient to mount the frequency converter 11 in the immediate proximity to the main motor 3, which would be necessitated by direct coupling, and under these conditions, it is advisable to employ a rigid coupling of an electrical nature. To this end, the frequency converter 7 is mounted on the shaft of an auxiliary induction machine 20, the primary member of which is shown single-phase and connected to one phase of the supply mains 4. The polyphase secondary member of the machine 20 is connected to the polyphase secondary member of a similar auxiliary induction machine 21 by suitable leads 22. The machine 21 is rigidly coupled to the motor 3, as by direct connection or by suitable gearing, and also has its primary winding connected to the same phase of the mains 4 as energizes the primary member of the motor 20.

The primary frequencies of the machines 20 and 21 are necessarily the same, as they are energized from the same mains 4 and derive their magnetizing current therefrom. The secondary frequencies of said two machines are also the same because of the direct interconnection therebetween and the machine 21 operates as an induction generator, driving the machine 20 as an induction motor and said two machines are necessarily locked in synchronism with respect to each other by virtue of the common primary field and secondary rotating field speeds. If said machines have the same pole number, they operate at the same speed and, if they have different pole numbers, they operate at different speeds determined by the pole number ratio. Furthermore, the angular position of the main machine rotor, as it leads or lags with varying load conditions, will be accurately reproduced by the machine 20, by reason of the synchronous properties of the machines 20 and 21. The machine 20 and the frequency converter 7 may be located at some distance from the main motor 3, an obvious advantage in steel mills and similar localities where space around the main rolls is at a premium and where the operating temperatures and other conditions are unfavorable.

For voltage adjustment between the machines 7 and the mains 4, we provide a motor-generator set 23 comprising synchronous machines 24 and 25. The machine 24 is of the relatively low voltage and large current capacity demanded by the secondary circuits of the motor 3 and has its slip rings 26 directly connected to the slip rings 11 of the frequency changer 7. The machine 24 is provided with a field winding 27 which is energized from a suitable source 28 through a reversing rheostat 30, said reversing resistor being preferably arranged in proximity to the motor 3, as shown. The machine 25 is shown as of the synchronous type, having its slip rings 31 directly connected to the mains 4 and having a field winding 32 energized from the source 28 through a resistor 33. The machine 25 is of the high-voltage, low-current type necessitated by its direct connection to the relatively high voltage supply mains 4.

It is necessary to produce a brush movement with every change in the speed setting of the main motor and, to this end, we may provide a solenoid 38 operative upon a core member 39 to shift the brush rigging 13 in addition to the load actuated solenoid 14. Said solenoid 38 may be connected in series with a rheostat 29 which is arranged to be adjusted in consonance with the rheostat 30, so that for every adjustment of the field current in the winding 27, producing a change in the voltage supplied to the main motor, there is a resultant shift in the brushes 9.

While we have shown the machine 25 as of the synchronous type, it may, if desired, be of the induction or other suitable type.

The operation of the system is as follows. For under-synchronous operation of the motor 3, the machine 21 acts as a generator, driving the machine 20 as a motor for the rotation of the frequency-converter 7 and energy is supplied from the secondary member of the motor 3 through said frequency converter 7 to the machine 24 which operates as a synchronous motor, driving the machine 25 as a synchronous generator and transferring the surplus energy of the motor 3 to the line. By gradually introducing resistance at the resistor 30, the field 27 is weakened and the back electromotive force of the machine 24 is reduced, lowering the secondary voltage of the motor 3 and permitting its approach to synchronous speed. When normal slip speed of the main motor is attained, all the apparatus runs idle and the direction of phase rotation may be reversed as by reversing the rheostat 30, reversing the polarity of the field of the machine 24. For over-synchronous operation, the machine 25 operates as a motor, driving the machine 24 as a generator and supplying energy through the frequency converter 7 to the frequency converter of the motor 3, the machines 21 and 20 functioning as before.

It will be noted that by the arrangement thus described, the only moving elements necessarily mounted in proximity to the rolls are the machines 3 and 21 and these machines are both of the induction type, a marked advantage as it is difficult to secure good commutation under the extreme conditions of darkness, dirt and rough treatment encountered in this portion of a steel mill. The machines 20, 7, 24 and 25 may be located in a separate room where they are well lighted, well ventilated and readily accessible for inspection.

The motor-generator set 23 comprises standard machines having desirable operating characteristics and the desired gradual change in the voltage of the alternating current for the secondary voltage of the motor 23 may be readily attained by the field control of the machine 24 at far less expense than with adjustable transformers with their attendant cumbersome and expensive switching mechanism.

While we have shown our invention in two of its preferred forms, it will be obvious to those skilled in the art that it is not so limited but is susceptible of various minor changes and modifications without departing from the spirit thereof and we desire, therefore, that only such limitations shall be placed thereupon as are imposed by the prior art or as are specifically set forth in the appended claims.

We claim as our invention:

1. The combination with a variable-speed main induction machine, of a frequency changer electrically connected to the secondary of said main induction machine, and dynamo electric means for causing said frequency changer to rotate at the same speed as said main induction machine and for securing correspondence in the angular position of the rotors of the two machines.

2. A control system comprising a variable-speed main induction machine, a frequency changer electrically connected to the secondary of said main induction machine, means for varying the voltage of said frequency changer, and dynamo-electric means for driving said frequency changer by said main induction machine, said means comprising a pair of auxiliary induction machines mechanically connected to the respective rotors of said main induction machine and said frequency changer, said auxiliary machines having their secondary members electrically connected and their primary members energized so as to cause the two rotors to assume, at all times, corresponding angular positions with respect to their stators.

3. A control system comprising a variable-speed main induction machine, a frequency changer of the commutator type electrically connected to the secondary of said main induction machine, means for varying the voltage of said frequency changer, dynamo electrical means for driving said frequency changer by said main induction machine, said means comprising a pair of auxiliary induction machines mechanically connected to the respective rotors of said main induction machine and said frequency changer, said auxiliary machines having their secondary members electrically connected and their primary members energized so as to cause the two rotors to assume, at all times, corresponding angular positions with respect to their stators, and means operable to produce the effect of shifting the position of the commutator brushes of said frequency changer in accordance with the load and speed setting of said motor.

4. A control system comprising, in combination, a polyphase net work, a variable-speed main induction machine having its primary winding connected to said net work, voltage-transforming means connected to said net work, a frequency changer electrically connected to the secondary of said main induction machine and to said voltage-transforming means, and dynamo-electric means for driving said frequency changer by said main induction machine, said means comprising a pair of auxiliary induction machines mechanically connected to the respective rotors of said main induction machine and said frequency changer, said auxiliary machines having their secondary members electrically connected to each other and their primary members connected to a common single phase of said polyphase net work.

5. A control system comprising, in combination, a polyphase net work, a variable-speed main induction machine having its primary winding connected to said net work, voltage-transforming means connected to said net work, a frequency changer of the commutator type electrically connected to the secondary of said main induction machine and to said voltage-transforming means, dynamo-electric means for driving said frequency changer by said main induction machine, said means comprising a pair of auxiliary induction machines mechanically connected to the respective rotors of said main induction machine and said frequency changer, said auxiliary machines having their secondary members electrically connected to each other and their primary members connected to a common single phase of said polyphase net work, and means operable to produce the effect of shifting the position of the commutator brushes of said frequency changer in accordance with the load and speed setting of said motor.

In testimony whereof, we have hereunto subscribed our names this 26th day of July 1917.

ADOLPHUS M. DUDLEY.
CHARLES W. KINCAID.